United States Patent
Diehl

[11] 3,831,099
[45] Aug. 20, 1974

[54] CONTROLLER HAVING GAIN SELECTABLE INDEPENDENTLY OF CONTROLLER OUTPUT

[75] Inventor: Elmer Paul Diehl, Wakefield, Mass.

[73] Assignee: The Babcock & Wilcox Company, New York, N.Y.

[22] Filed: Jan. 27, 1972

[21] Appl. No.: 221,239

[52] U.S. Cl. ................ 328/71, 330/1 A, 330/85
[51] Int. Cl. .............................................. H03f 1/32
[58] Field of Search .... 328/1, 69; 235/151.1, 150.1; 330/1 A, 85

[56] References Cited
UNITED STATES PATENTS

| | | | |
|---|---|---|---|
| 3,377,548 | 4/1968 | Newbold | 330/1 A |
| 3,526,839 | 9/1970 | Schmoock | 328/1 A |
| 3,530,389 | 9/1970 | Gormley | 330/1 A |
| 3,550,014 | 12/1970 | Richardson | 328/1 |
| 3,601,711 | 8/1971 | Richardson | 330/1 A |
| 3,613,020 | 10/1971 | McBride | 330/1 A |
| 3,657,660 | 4/1972 | Pfersch | 328/1 |
| 3,662,275 | 5/1972 | Riley | 328/1 |
| 3,662,276 | 5/1972 | Hyer | 328/1 |
| 3,676,782 | 7/1972 | Lane | 330/1 A |
| 3,696,304 | 10/1972 | Fricke | 330/1 A |

Primary Examiner—John S. Heyman
Attorney, Agent, or Firm—J. Maguire, Esq.; J. P. Sinnott, Esq.

[57] ABSTRACT

A process controller having selectable feedback networks for changing the controller gain independently of the controller output. Each feedback network includes proportional and rate control circuitry. When a particular feedback network is not connected in the feedback path of the controller, it is connected to ground and its rate capacitor is discharged, thereby allowing a smooth transfer of control when the feedback network is switched into the controller circuit.

8 Claims, 1 Drawing Figure

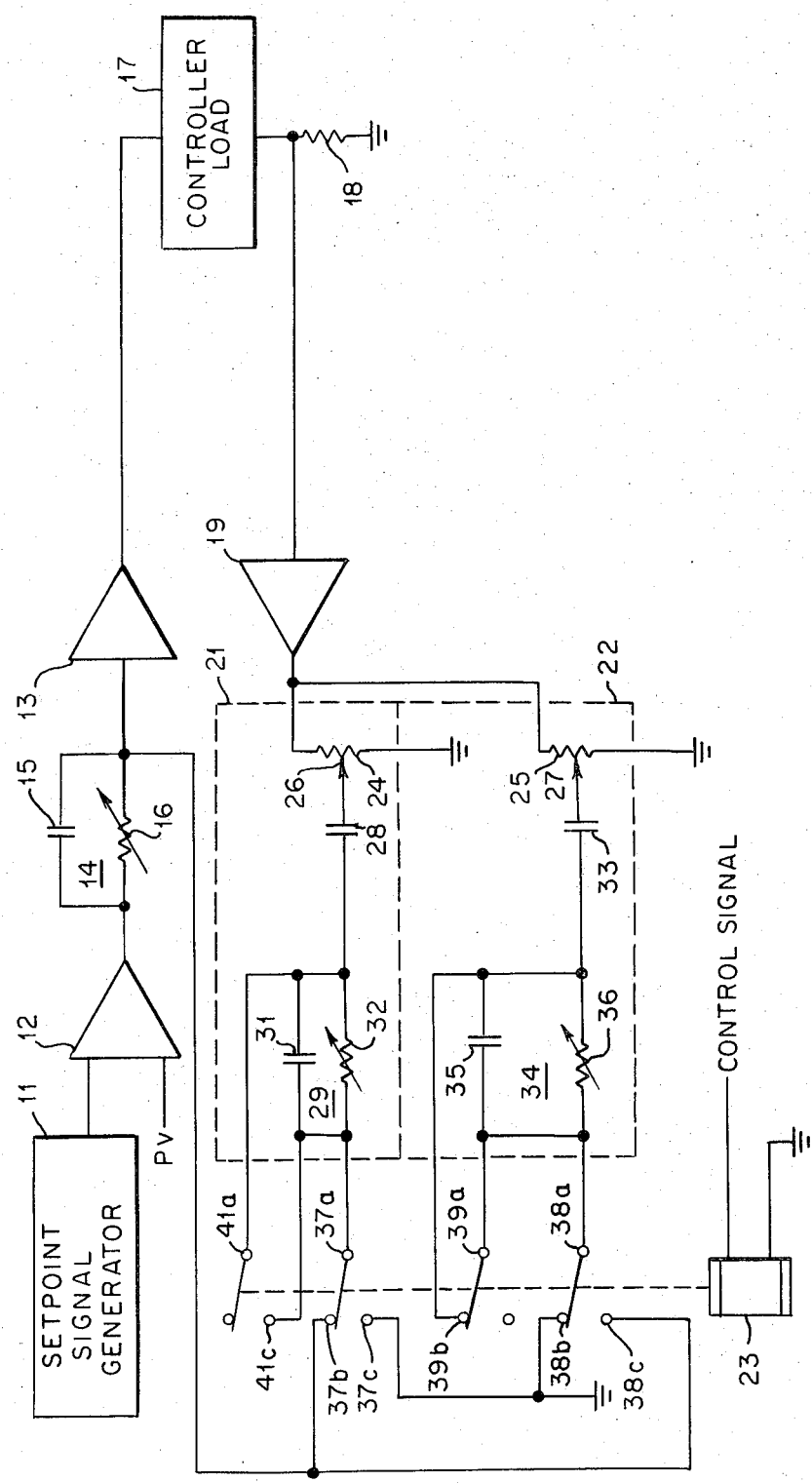

CONTROLLER HAVING GAIN SELECTABLE INDEPENDENTLY OF CONTROLLER OUTPUT

BACKGROUND OF THE INVENTION

This invention relates to process control devices, and more particularly to a process controller having values of gain automatically selected independently of the controller output.

Process controllers of the electronic type are now widely used for automatic control of industrial processes. In a closed loop process control system using process controllers, selected process characteristics or variables are monitored by transducers, eahc of which generates a process variable signal proportional to the magnitude of the monitored variable. The process controller compares a particular process variable signal to a setpoint signal which is proportional to a desired magnitude of that variable to obtain an error or deviation signal. The process controller uses the deviation signal to generate an output signal which controls an actuator such as a motor controlled valve, which will affect the process so as to drive the process variable component its desired value. Typically, a process controller includes a voltage amplifier having an input circuit controlled by the deviation signal, an output and controlling a load and a negative feedback circuit connecting the input and output circuits of the amplifier which establishes the gain of the process controller and stabilizes the control system.

Process controllers can be classified according to the characteristics of the output signals which are generated as a result of a change in the input signal. In a single mode controller, the change in the output is proportional to the deviation signal, as determined by the gain of the process controller. In a two-mode controller, the output change is the algebraic sum of two components, a proportional component as described by the time integral of the deviation signal. In a three-mode controller, the output signal has the proportional and reset components, and additionally has a rate component which is determined by the derivative with respect to time of either the deviation signal or the process variable signal.

For some types of processes, called batch process, it is desirable to have the gain change during certain stages of the process. An example of such a process would be a fabric-heating oven wherein air must be heated to within several degrees of [ flow poimt of a fabric within a relatively short period of time in order to maximize production. During this start-up stage of the process, fuel is supplied to the heating oven at a maximum rate and the process controller should have a high gain so that when the temperature of the air approaches the flow point of the fabric, there will be a rapid decrease in the process controller output thus causing a rapid decrease in the process controller output thus causing a rapid reduction of fuel input, thereby preventing temperature overshoot. Once the air has been heated to the desired temperature, the amount of fuel required to maintain the over at the desired temperature is significantly reduced. If, during this steady-state stage of the process, the amount of fuel were controlled by a process controller having a high gain as required during the start-up stage of the process, the process controller would overreact to the temperature deviations encountered. It is, therefore, desirable to reduce the gain of the process controller to a value which will insure system stability during this steady-state stage of the batch process.

In a typical controller, the controller gain is controlled manually by means of a potentiometer in the feedback network of the controller amplifier. However, this method of changing gain requires that there be an attendant and that he perform the manual gain adjustment at the proper point during the process.

Another approach which is suitable to the control of the batch process provides automatic gain change based on the magnitude of the controller output. Such an approach is described in my copending application, Ser. No. 81,462, filed Oct. 16, 1970, now U. S. Pat. No. 3,708,754, and assigned to the assignee of this invention. In that approach, the controller gain is automatically changed at a predetermined level of the controller output. The controller circuit of the copending application is particularly suited for the control of those processes wherein the instant at which the controller gain is to be changed is related to the controller output. However, in some instances, it may be more desirable to determine the instant at which the controller gain is changed based on some process variable, such as temperature or time, rather than on the level of the controller output.

Yet another approach for changing the controller gain would be to employ a number of process controllers having different gains and automatically switching from one process controller to another based on predetermined levels of some process variable during the process. Such a system is relatively costly due to the added cost of the extra controllers.

Accordingly, it is an object of this invention to provide an improved process controller.

It is another object of this invention to provide a process controller with automatic, selectable change of the controller gain.

And yet another object of this invention is to provide a process controller wherein the controller gain is automatically selectable independently of the controller output.

SUMMARY OF THE INVENTION

The present invention is a process controller having selectable feedback networks for changing the controller gain independently of the controller output.

The process controller of this invention includes a setpoint generator for generating a signal proportional to the desired value of a process variable. A difference amplifier generates a deviation signal proportional to the difference between the setpoint signal and a signal representing the actual value of the process variable. This deviation signal is amplified to drive an acutator, or controller load, which will affect the process so as to drive the process variable toward the desired value. The process controller has a plurality of feedback networks connected to the controller through switching means, each feedback network including proportional and rate control circuitry. When one feedback network is connected to the controller circuit, the other feedback networks are connected to ground and their rate capacitors are discharged, thereby guaranteeing a smooth transfer of control when the feedback networks are switched into the controller circuit.

DESCRIPTION OF THE DRAWING

While the specification concludes with claims particularly pointing out and distinctly claiming that which is regarded as the present invention, certain details of a preferred embodiment of the invention may be more readily ascertained from the following detailed description when read in conjunction with the accompanying drawing. The drawing, which is partially in block diagram form, shows a process controller capable of having its gain automatically selected independently of the controller output.

DETAILED DESCRIPTION

The drawing is a schematic, partially in block diagram form, of the controller of this invention. The setpoint signal generator 11 establishes a signal proportional to the desired magnitude of a process variable. The process variable signal, PV, represents the present measured value of the process variable. Difference amplifier 12, which is responsive to both the setpoint signal and the process variable signal generates a deviation signal which is proportional to the difference between the setpoint and process variable signals. This deviation signal is applied to the input of amplifier 13 through a network 14 comprised of capacitor 15 connected in parallel with variable resistor 16. Amplifier 13 supplies current to the controller load 17 which, for example, could be a motor-controlled valve, which will affect the process so that the process variable will be driven toward the desired value as represented by the setpoint signal. A feedback resistor 18 connected in series with the controller load 17 is used to develop a voltage proportional to the controller load current. Feedback amplifier 19 senses the voltage developed across feedback resistor 18 and provides a feedback voltage to the input of amplifier 13, either through a first feedback network 21 or a second feedback network 22 as determined by the control signal input to relay 23.

The feedback voltage developed by feedback amplifier 19 is applied to potentiometer 24 in the first feedback network 21 and to potentiometer 25 in the second feedback network 22. The position of the arm 26 of potentiometer 24 and the arm 27 of potentiometer 25 determines the magnitude of feedback voltage that is fed back to the input of amplifier 13 through the feedback networks 21 and 22 respectively.

The first feedback network 21 also includes a capacitor 28 and a rate network 29 consisting of capacitor 31 connected in parallel with variable resistor 32. Similarly, the second feedback network 22 also includes a capacitor 33 and a rate network 34 consisting of capacitor 35 connected in parallel with variable resistor 36. Variable resistors 32 and 36 in rate circuits 29 and 34 allow for manual control of the effect of each rate circuit on the controller output.

The process controller as illustrated in the drawing is a three-mode controller. When the first feedback network 21 is connected to the input of amplifier 13, capacitor 15 and capacitor 28 determine the proportional component of the amplifier 13 output, variable resistor 16 and capacitor 28 determine the integral, or reset, component of the amplifier 13 output and variable resistor 32 and capacitor 31 determine the derivative, or rate, component of the amplifier 13 output. The setting of potentionmeter 24 acts as a multiplying factor, or manual gain setting, for the proportional and integral components. In a similar manner, when the second feedback network 22 is connected to the input of amplifier 13, the proportional conponent will be determined by capacitor 15 and capacitor 33, the integral component will be determined by variable resistor 16 and capacitor 33 adn the derivative component will be determined by variable resistor 36 and capacitor 35.

When the state of the CONTROL SIGNAL is such that the relay 23 is not energized, the contacts of relay 23 are as shown in the drawing and the first feedback network 21 is connected to the input of amplifier 13 through closed contacts 37a and 37b. While the first feedback network 21 is in the controller circuit, the second feedback network 22 is connected to ground through closed contacts 38a and 38b, and closed contacts 39a and 39b act to prevent any voltage from building up on rate capacitor 35 which guarantees a smooth transfer of control when the second feedback network 22 is switched into the controller circuit.

When the state of the CONTROL SIGNAL is such that the relay 23 is energized, contacts 37a and 37b are now open, thereby disconnecting the first feedback network 21 from the input of amplifier 13. The first feedback network 21 is connected to ground through now closed contacts 37a and 37c, and contacts 41a and 41c are now closed discharging rate capacitor 31. This guarantees a smooth transfer of control in the event the first feedback network 21 is switched back into the controller circuit. When the relay 23 is energized, contacts 39a and 39b become open and contacts 38a and 38c become closed, thereby connecting the second feedback network 22 to the input of amplifier 13.

It can thus be seen that a control signal, completely independent of the output of the controller can be used to select the feedback utilized by the controller. This selection allows the amplifier output to have first values of proportional, integral and derivative components when the first feedback network is switched into the controller circuit and second values of proportional, integral and derivative components when the second feedback network is switched into the controller circuit.

In the foregoing discussion, difference amplifier 12, amplifier 13 and feedback amplifier 19 have each been shown as conventional operational amplifiers. The circuit details of such amplifiers are well known to those skilled in the electronic controller art and no further description is believed necessary.

While the present invention has been described with reference to a specific embodiment thereof, it will be obvious to those skilled in the art that various changes and modifications may be made without departing from the invention in its broader aspects. For example, a third condition can be created wherein the two feedback networks of the described embodiment are both connected to the input of the amplifier, or in another configuration, more than two feedback networks can be employed. Also, the relay of the described embodiment could be accomplished with equivalent switching means such as an electronic switch. It is contemplated in the appended claims to cover all variations and modifications of the invention which come within the true spirit and scope of the invention.

What is claimed as new and desired to be secured by Letters Patent of the United States is:

1. A process controller for driving an actuator comprising:
   a. means for generating a setpoint signal proportional to a desired value of a process variable;
   b. means for generating a process variable signal proportional to a measured value of said process variable;
   c. first circuit means responsive to the setpoint signal and the process variable signal for generating a deviation signal proportional to the difference between the setpoint signal and the process variable signal;
   d. second circuit means responsive to the deviation signal for generating a drive signal for the actuator, said drive signal being proportional to the deviation signal;
   e. third circuit means connected to the actuator and responsive to the drive signal for generating a feedback signal proportional to the drive signal;
   f. a plurality of feedback networks, each being selectively responsive to the feedback signal and each enabling said second circuit means to have respective proportional drive signals and each of said networks having an individual output terminal;
   f. switching means connected to the output terminals of said feedback networks, the second circuit means and to a circuit ground for selectively switching said output terminals between the second circuit means and the circuit ground to enable said second circuit means to generate a respective proportional drive signal; and
   h. means for generating a control signal for operating the switching means independently of said drive signal and said deviation signal.

2. A process controller as recited in claim 1 wherein the second circuit means comprises an input circuit responsive to the deviation signal and an amplifier for generating the drive signal, the input of said amplifier being connected to said input circuit and to said selected feedback network.

3. A process controller as recited in claim 2 wherein the control signal has one state corresponding to each feedback network, each of said states causing the switching means to connect the output terminal of the feedback network corresponding to said state to the amplifier input and the output terminal of the other feedback networks to the circuit ground.

4. A process controller as recited in claim 3 wherein the switching means is comprised of at least one relay.

5. A process controller as recited in claim 3 wherein each of said feedback networks is comprised of a potentiometer connected between the feedback signal and the circuit ground and a proportional capacitor connected between the arm of the potentiometer and the feedback network output terminal and wherein the amplifier input circuit comprises a capacitor in parallel connection with a variable resistor, said drive signal having a first component proportional to the deviation signal and a second component proportional to the time integral of the deviation signal.

6. A process controller as recited in claim 5 wherein each feedback network further comprises a rate network connected between the proportional capacitor and the feedback network output terminal, said drive signal having a third component proportional to the time derivative of the deviation signal.

7. A process controller as recited in claim 6 wherein each of the rate networks is comprised of a variable resistor in parallel connection with a capacitor.

8. A process controller as recited in claim 7 wherein the switching means is comprised of at least one relay, said relays including contacts so connected to each of the rate capacitors as to short circuit the rate capacitor in each feedback network whose output terminal is connected to ground.

* * * * *